(12) United States Patent
He et al.

(10) Patent No.: US 11,752,848 B1
(45) Date of Patent: Sep. 12, 2023

(54) LOCKING STRUCTURE FOR THE COVER OF PICKUP TRUCK

(71) Applicant: RUIAN XIANGRUI AUTO ELECTRICAL APPLIANCE CO., LTD, Wenzhou (CN)

(72) Inventors: Dewei He, Rui'an (CN); Anqi He, Rui'an (CN); Ziyao He, Rui'an (CN)

(73) Assignee: RUIAN XIANGRUI AUTO ELECTRICAL APPLIANCE CO., LTD, Wenzhou (CN)

( * ) Notice: Subject to any disclaimer, the term of this patent is extended or adjusted under 35 U.S.C. 154(b) by 0 days.

(21) Appl. No.: 17/993,925

(22) Filed: Nov. 24, 2022

(30) Foreign Application Priority Data

Sep. 30, 2022 (CN) .......................... 202211211179.6

(51) Int. Cl.
*B60J 7/19* (2006.01)
(52) U.S. Cl.
CPC ..................................... *B60J 7/198* (2013.01)
(58) Field of Classification Search
CPC ... B60J 7/198; B60J 7/185; B60J 7/102; B60J 7/104; B60J 7/141
See application file for complete search history.

(56) References Cited

U.S. PATENT DOCUMENTS

| 6,361,086 B1 * | 3/2002 | Robbins | B60J 7/198 |
| | | | 292/DIG. 5 |
| 9,981,537 B2 * | 5/2018 | Xu | B60J 7/104 |
| 10,500,934 B1 * | 12/2019 | Weng | B60J 7/1858 |
| 11,027,603 B1 * | 6/2021 | Zheng | B60J 7/1607 |
| 2021/0229538 A1 * | 7/2021 | Becker | E05C 1/006 |
| 2022/0001730 A1 * | 1/2022 | Cai | B60J 7/198 |
| 2022/0242212 A1 * | 8/2022 | Lutzka | B60J 7/141 |

FOREIGN PATENT DOCUMENTS

| CN | 208134194 U | 11/2018 |
| CN | 208264090 U | 12/2018 |
| CN | 210211999 U | 3/2020 |

\* cited by examiner

*Primary Examiner* — Jason S Morrow
(74) *Attorney, Agent, or Firm* — Nitin Kaushik

(57) ABSTRACT

The invention relates to a locking structure for the cover of a pickup truck, including fixed side frames and locking frame. The locking slot is provided on the fixed side frame. The locking frame comprises the horizontal frame body and connecting pieces. The connecting piece is provided with a locking box and the locking piece and reset piece are arranged in the locking box. The locking box is set with the first button and the second button. When touching the first button, the locking piece will pop out and the second button will bulge outward. Pressing on the second button will cause the locking piece to contract, and it will make the locking box pop up. This structure is easy to operate and simple.

7 Claims, 7 Drawing Sheets

LOCKING STRUCTURE FOR THE COVER OF PICKUP TRUCK

CROSS-REFERENCE TO RELATED APPLICATIONS

The application claims priority to Chinese patent application No. 202211211179.6, filed on Sep. 30, 2022, the entire contents of which are incorporated herein by reference.

TECHNICAL FIELD

The invention relates to a pickup truck fitting, in particular to a locking structure of pickup truck cover.

BACKGROUND

Normally a typical pickup truck is used to carry goods, there's no cover on the top of the truck, therefore, the goods are very easy to be wet by rain or blew away by wind. So, there is a pickup truck cover for blocking the pickup truck. The cover of a pickup truck is usually fixed around the car, and the middle is covered with leather. General pickup truck cover fixed more rigid, need to disassemble the entire pickup truck cover, it wastes a lot of time.

Currently, U.S. Ser. No. 10/500,934B1 discloses a locking structure and the pickup truck hatch cover which contain this locking structure, this locking structure and the pickup truck hatch cover which contain this locking structure, through the sliding box assembly which contains control box, sliding handle and cable components, the sliding handle can be installed in the control box in a direction perpendicular to the longitudinal direction of the locking frame, the two ends of the cable components are respectively connected to the locking components of the two locking box assemblies, and the cable components is pressed against the sliding handle. When the locking frame is installed at the end portion of two fixed side frames, at least one resetting part can push the locking bolt to be clamped into the locking slot, and the sliding handle can drive the cable components to release the locking bolt from the locking slot, however, it is easy to damage while the cable components driven by pulling the sliding handle, which also makes the operation inconvenient and the structure complex.

SUMMARY

The technical problem that this invention wanted to solve is to provide a locking structure for the cover of pickup truck in view of the shortage of the prior technology.

In order to achieve the above purposes, the invention provides the following technical scheme: a locking structure for the cover of pickup truck, including two fixed side frames and locking frame, the inner wall of the fixed side frame is provided with a locking slot, one end of the locking slot near the locking frame is provided with a positioning seat, one end of the positioning seat facing the locking frame is provided with a positioning clip slot, the locking frame comprises a horizontal frame body and two connecting pieces respectively installed at both ends of the horizontal frame body, the connecting pieces is connected to the fixed side frame, one end of the connecting piece towards the positioning seat is provided with locking box, the other end of the locking box is movable connected with the positioning clip slot, it is characterized in: the locking box is provided with a locking member and a reset member, the reset member is connected with the locking member; a first button and a second button are arranged on the locking box, when the first button touch with the locking slot, the reset member will prompt the locking member to eject, the second button will bulge outward, when the second button bulge, pressing the second button will cause the locking member to shrink, and make the locking box pop up.

By adopting the above technical scheme, the initial making state of the invention is the inward contracting state, when the horizontal frame body is mounted on the end of the fixed side frame, through the touching of the first button and the locking slot, the locking member will pop out under the action of the reset member and insert into the locking slot of the fixed side frame to lock the locking structure, and this moment the second button will pop out, when the second button is raised, pressing the second button will automatically cause the locking part to shrink and make the lock box pop up, this structure is easy to operate, simple in structure and not easy to damage.

Further settings of the above technical scheme are as follows: the locking box comprises a limiting slot and a locking cover plate covering the limiting slot, the two ends of the limiting slot are respectively provided with a mounting slot for placing the locking member. One end of the mounting groove toward the locking slot is provided with a first opening adapted to the locking member, the other end is provided with a third opening adapted to the second button; one end of the second button toward the locking cover plate is provided with a sliding slot, a second opening adapted to the first button is arranged between the first opening and the third opening, the position of the second opening is parallel to the position of the locking slot.

Using the above technical solution, the locking box can be prevented from being damaged by locking parts through the installation slot, and the position of the second opening is parallel to the position of the locking slot, when the horizontal frame body is installed on the end of the fixed side frame, the first button touch with the locking slot, which is easy to operate and simple in structure.

The further setting of the above technical solution is: the first button comprises a placement slot and a locking spring is arranged in the placement slot, both ends of the placement slot are provided with a convex plate extending outward, and the length of the convex plate is greater than the first opening, the placement slot is provided with a positioning chute to the first opening, the second opening is provided with a slider to the positioning chute.

With the above technical solution, the ejection of the locking structure can be better prevented by the convex plates extending outward which is provided at both ends of the placement slot.

The technical scheme is further set as follows: one end of the locking cover plate towards the limit slot is provided with a fixed block for fixing the placement slot and a movable block adapted to the sliding slot, and the fixed block is parallel to the movable block.

Using the above technical scheme, the reset piece can be better fixed through the fixed block, and the movable block adapted to the sliding slot can further limit the second button not to be damaged.

The technical scheme is further set as follows: one end of the locking piece is provided with a locking bolt, the other end is provided with a spring groove connected with the reset piece, and the other end of the reset piece which is connected with the locking piece is against the locking box.

Using the above technical scheme, by pushing one end of the reset part against the locking box, the locking part can be better prompted to pop out and insert into the locking slot of the fixed side frame.

The technical scheme is further set as follows: the spring groove is provided with a boss extending to the third opening, the boss is provided with a convex block extending upward, and also provided with the limiting part, one end of the convex block toward the first opening is connected with one end of the limiting member, the other end of the limiting part is connected with the second button, and the limiting part is with the limiting hole, and the limiting slot is provided with a movable piece for connecting the limiting hole.

Adopting the above technical scheme, the horizontal frame body is installed on the end of the fixed side frame, the first button touch with the locking slot, and the first button moves to the limit slot, and the boss on the locking piece will move to the convex plate and clamp it, the locking bolt of the locking piece will be inserted into the locking slot of the fixed side frame through the reset piece to lock the locking structure, at this time the second button will be raised outward, pressing the raised second button, the limiting part will be pushed inward by the second button, through one end of the convex block towards the first opening is connected with one end of the limiting part, the other end of the limiting part is connected with the second button, the limiting part will drive the locking part to shrink inward, so that the locking box will bounce up, this method is easy to operate, simple structure, not easy to damage.

The technical scheme is further set as follows: the shape of the second button is T-shaped.

By adopting the above technical scheme, the shape of the second button is T-shaped, which can better promote the contraction of the locking part.

The beneficial effect of the invention is as follows: when the horizontal frame body is installed on the end of the fixed side frame, through the first button touch with the locking slot, the locking part, under the action of the reset part, will make the locking bolt pop out and insert into the locking slot of the fixed side frame to lock the locking structure. Then the second button will pop out, when the second button is raised, pressing the second button will automatically make the bolt of the locking piece shrink, so that the locking box will bounce up, this structure is easy to operate, and simple and not easy to damage.

DETAILED DESCRIPTION OF THE EMBODIMENTS

Figure 1:
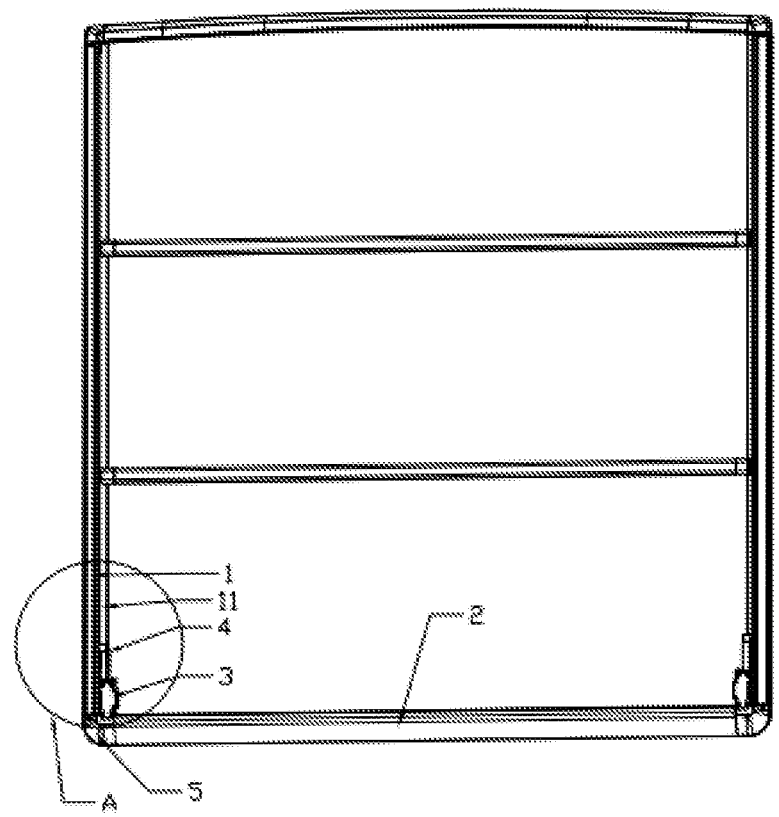
FIG. 1 is a structural diagram of an embodiment of the invention.
Figure 2:
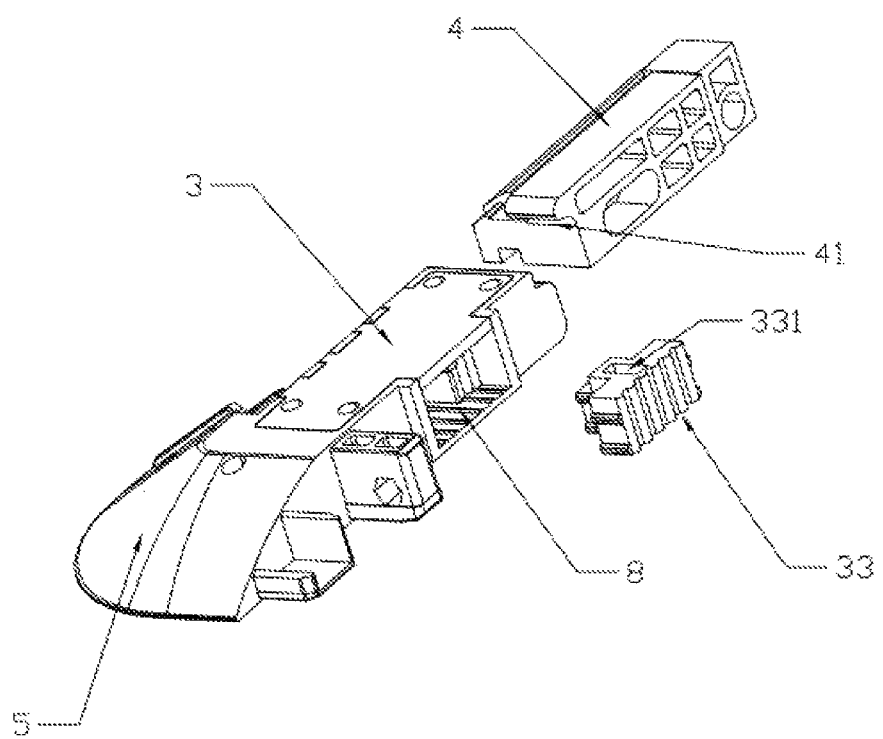
FIG. 2 is a structural diagram of the positioning seat and connecting piece of the embodiment of the invention.

Refer to FIGS. 1, 2, 3, and 7, the locking structure is applied to the cover of the pickup truck, and mainly include two fixed side frame 1 and the locking frame. The two fixed side frames 1 are set parallel to each other, and the locking frame is perpendicular to the two fixed side frames 1. The inner wall of the fixed side frames 1 is provided with the locking slot 11. One end of the locking slot 11, which is near the locking frames is provided with positioning seat 4. One end of the positioning seat 4 facing the locking frame, is provided with a positioning clip slot 41. The locking frame comprises a horizontal frame body 2 and two connecting pieces 5 respectively installed at both ends of the horizontal frame body. The connecting pieces 5 is connected with fixed side frames 1. One end of the connecting pieces 5 which is facing the positioning seat 4, is provided with a locking box 3. The other end of the locking box 3 is movably connected with the positioning clip slot 41. The locking box 3 is with locking member 34 and resetting member 345, the resetting member 345 is connected with locking member 34. The locking box 3 is set with the first button 6 and the second button 33. The initial state of the locking member 34 of the invention is the stage of shrinkage. When the horizontal frame body 2 is installed on the end of the fixed side frame 1, through the touching of the first button 6 and the locking slot 11, resetting part 345 causes locking part 34 to eject. Thereafter, the second button 33 will bulge out, when the second button 33 is raised. Further, pressing the second button 33 causes the locking part 34 to contract, and makes the locking box 3 to pop up. This structure is easy to operate, simple and not easy to damage.

Figure 3:
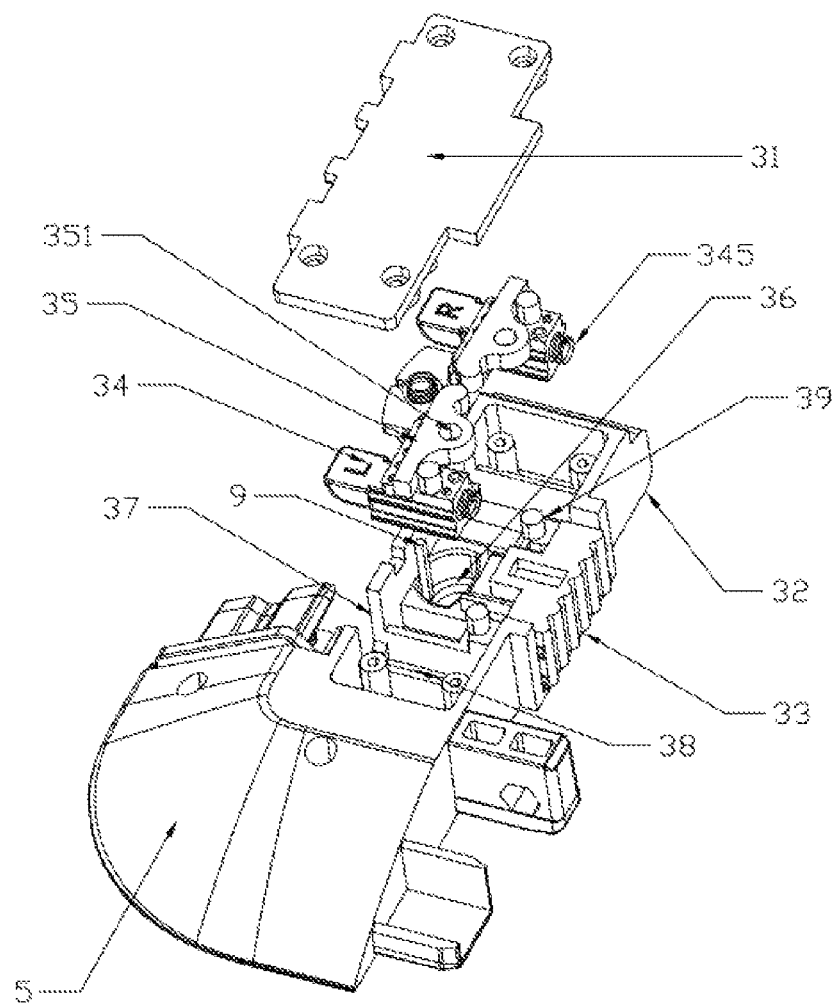
FIG. 3 is a structural diagram of the expanded connector of the embodiment of the invention.

Refer to FIG. 3, the locking box 3 includes the limiting slot 32 and the locking cover 31 which is used for covering the limiting slot 32. The two ends of the limiting slot 32 are respectively provided with the mounting slot 38 for placing the locking member 34. The mounting slot 38 provided with the limiting slot 32 can prevent the damage of locking member 34 to locking box 3. One end of the mounting slot 38 which is facing the locking slot 11, is provided with a first opening 37 which adapted to the locking member 34, the other end is provided with the third opening 8 which is adapted to the second button 33. One end of the second button 33 which is towards the locking cover plate 31, is provided with the sliding slot 331. The shape of the second button 33 is T-shaped. Itis provided with the second opening 36 which is adapted to the first button between the first opening 37 and the third opening 8. The position of the second opening 36 is parallel to the position of the locking slot 11, and it will make the first button 6 touch with the locking slot 11 when the horizontal frame body 2 is installed on the end of the fixed side frame 1. This is easy to operate and simple structure.

Figure 6:
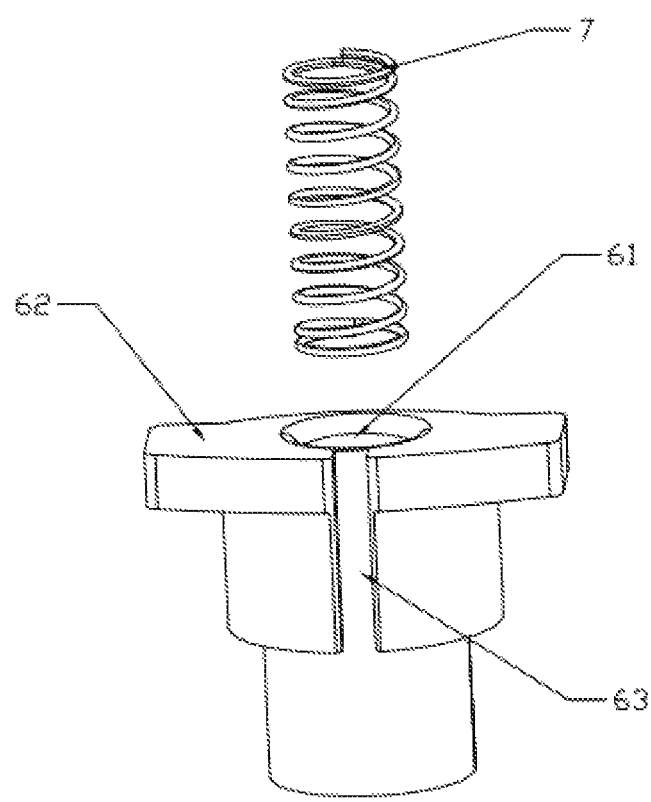
FIG. 6 is a structural diagram of the unfolded first button of the embodiment of the invention.
Figure 7:
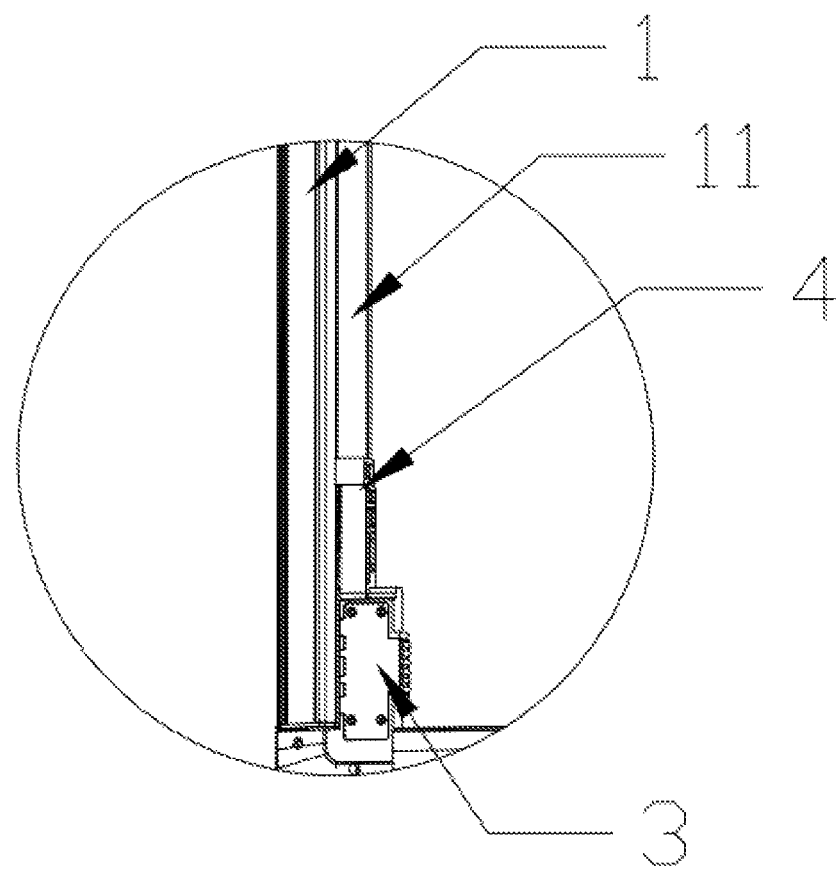
FIG. 7 is an enlarged structural diagram of FIG. 1A.

Refer to FIGS. 3 and 6, the first button 6 includes the placing slot 61, and the placing slot 61 is provided with the locking spring 7. Both ends of the placement slot 61 are provided with the convex plate 62 which is extending outward, and the length of the convex plate 62 is greater than the first opening 37. It can better prevent the locking structure from popping out. The end of placement groove 61 to the first opening 37 is provided with the positioning chute 63. This second opening 36 is provided with the slider 9 adapted to the positioning chute 63.

Figure 5:
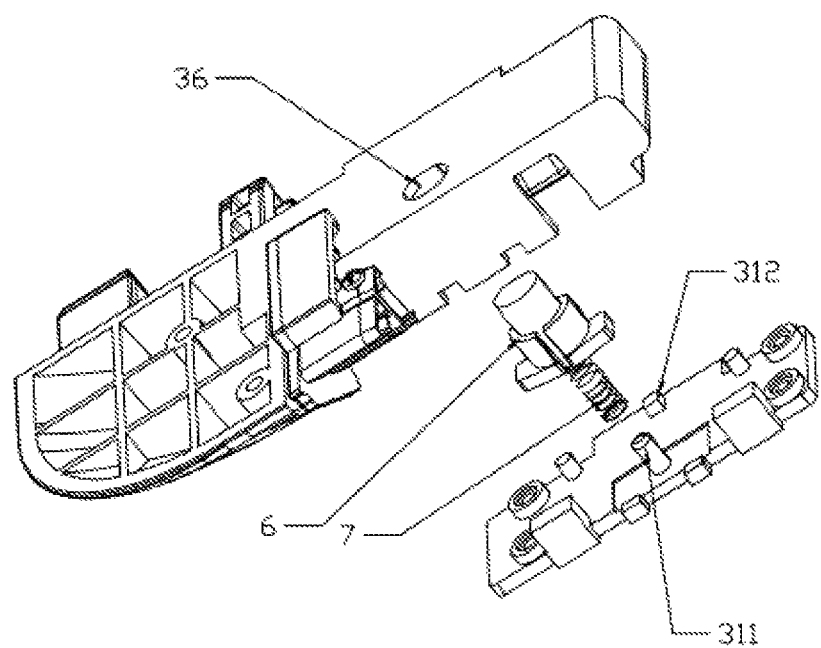
FIG. 5 is a structural diagram of the unfolding locking box of the embodiment of the invention.

Refer to FIGS. 3 and 5, one end of the locking cover plate 31 towards the limiting slot 32 is provided with a fixed block 311 for fixing the placement slot 61 and a movable block 312 for fitting with the sliding slot 331. The fixed block 311 is parallel to the movable block 312, fixed block 311 can better fix the reset piece 345. The movable block 312 adapted to sliding slot 311 can further limit the second button, not easy to damage.

Figure 4:
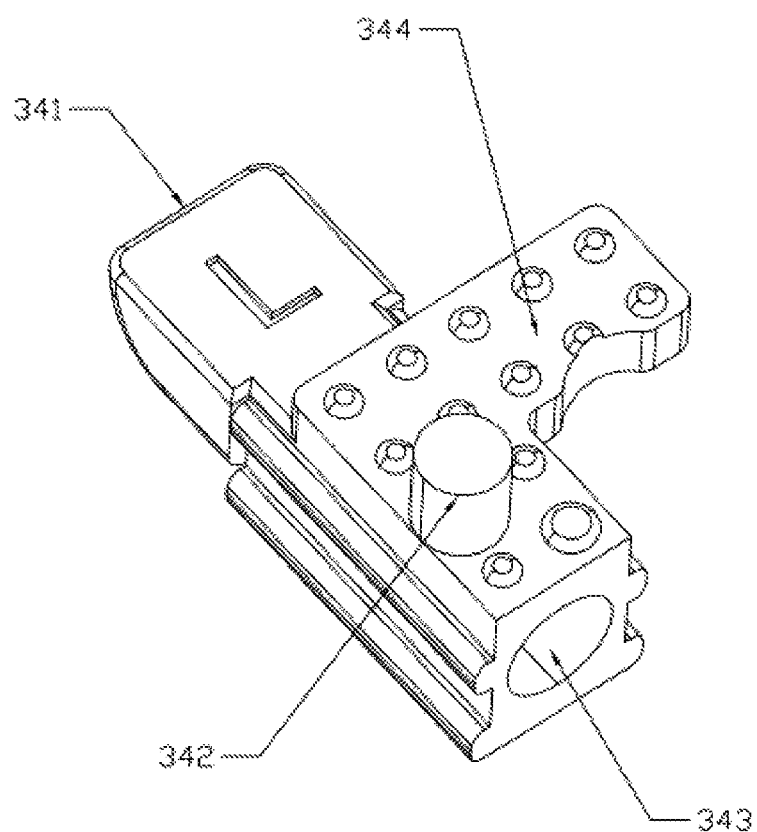
FIG. 4 is a structural diagram of the locking member of the embodiment of the invention.

Refer to FIG. 4, one end of the locking member 34 is provided with bolt 341, the other end is provided with the spring groove 343 connected with the reset piece 345. The other end of the resetting member 345 which is connected with the locking member 34 contacts the locking box 3. The locking piece 34 can be better prompted to pop out and insert into the lock slot 11 in the fixed side frame 1.

Refer to FIG. 3 to FIG. 4, the spring groove 343 is provided with boss 344 extending to the third opening 8. The boss 344 is provided with the convex block 342 which is extending upward. The boss 344 is provided with the limiting member 35. One end of the convex block 342 which towards the first opening 37 is connected with one end of limiting part 35. The other end of limiting part 35 is connected with the second button 33. The limiting part 35 is with limiting hole 351. The limiting slot 32 is provided with the movable part 39 which is used for connecting the limiting hole 351. When the horizontal frame body 2 is installed at the top end of the fixed side frame 1, the first button 6 touches the locking slot 11, and the first button 6 moves to the limiting slot 32. The boss 344 on locking piece 34 will move to convex block 62 and clamp with it. The bolt 341 of the locking member 34 will pop out through the resetting member 345 and insert into the locking slot 11 of the fixed side frame 1 to lock the locking structure, then the second button 33 will pop out, pressing the second button 33 which is popped out. The limiting part 35 will be pushed inward by the second button 33, through the connecting of the end of the convex block 342 which is facing the first opening 37 and the end of the limiting part 35. The other end of the limiting part 35 is connected with the second button 33. The limiting part 35 will drive the locking part 34 inward contraction, so that the locking box 3 will pop up, this structure is easy to operate, simple and not easy to damage.

What is claimed is:

1. A locking structure for the cover of pickup truck, including two fixed side frames and a locking frame, an inner wall of the mentioned fixed side frame is provided with a locking slot, one end of the mentioned locking slot which is near the locking frame is provided with a positioning seat, one end of the mentioned positioning seat facing the locking frame is provided with a positioning clip slot, the mentioned locking frame comprises a horizontal frame body and two connecting pieces respectively installed at both ends of the horizontal frame body, the mentioned connecting piece is attached to the fixed side frame, one end of the mentioned connecting piece toward the positioning seat is provided with a locking box, the other end of the mentioned locking box is connected to the positioning clip slot, it is characterized in: a locking piece and a reset piece are arranged in the mentioned locking box, the mentioned reset piece is connected with the locking piece; the mentioned locking box is set with a first button and a second button, when the first button touch with the locking slot, a reset part will prompt the locking part to eject, the second button will bulge outward, when the second button bulge, pressing the second button will cause the locking piece to contract, and will make the lock box pop up.

2. According to claim 1, it is mentioned a locking structure of the cover of pickup truck, it is characterized in: the mentioned locking box comprises a limiting slot and a locking cover plate covering the limiting slot, the two ends of the limiting slot are respectively provided with a mounting slot for placing the locking part, one end of the mounting slot toward the locking slot is provided with a first opening adapted to the locking piece, the other end is provided with a third opening adapted to the second button; one end of the mentioned second button which towards the locking cover plate is provided with a sliding slot; a second opening adapted to the first button is provided between the first opening and the third opening, the position of the second opening is parallel to the position of the locking slot.

3. According to claim 1, it is mentioned a locking structure of the cover of pickup truck, it is characterized in: the first button comprises a placement slot, the placement slot is provided with a locking spring, the both ends of the placement slot are provided with convex plates extending outward, the length of the convex plate is greater than a first opening, the placement slot is provided with a positioning chute to the first opening, a second opening is provided with a slider adapted to the positioning chute.

4. According to claim 2, it is mentioned a locking structure of the cover of pickup truck, it is characterized in: one end of the locking cover plate toward a limiting slot is provided with a fixed block for fixing the placement slot and a movable block adapted to a sliding slot, the fixed block is parallel to the movable block.

5. According to claim 1, a locking structure of the cover of pickup truck, it is characterized in: one end of the mentioned locking piece is provided with a locking bolt, the other end is provided with a spring groove connected with the reset piece, the other end of the reset part which is connected with the locking part is against the locking box.

6. According to claim 4, a locking structure of the cover of pickup truck, it is characterized in: a spring groove is provided with a convex platform extending to the third opening, the convex platform is provided with a convex block extending upward, the convex platform is provided with a limiting part, one end of the convex block toward the first opening is connected with one end of the limiting part, the other end of the limiting part is connected with the second button, the limiting part is provided with a limit hole, the limiting slot is provided with a movable piece for connecting the limiting hole.

7. According to claim 1, a locking structure of the cover of pickup truck, it is characterized in: the shape of the second button is T-shaped.

\* \* \* \* \*